(12) United States Patent
Alenljung et al.

(10) Patent No.: US 11,156,712 B2
(45) Date of Patent: Oct. 26, 2021

(54) AUTOMOTIVE RADAR SYSTEM WITH DIRECT MEASUREMENT OF YAW RATE AND/OR HEADING OF OBJECT VEHICLE

(71) Applicant: DENSO CORPORATION, Kariya (JP)

(72) Inventors: Klas Alenljung, Bohus (SE); Ola Thomson, Goeteborg (SE)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/857,722

(22) Filed: Apr. 24, 2020

(65) Prior Publication Data

US 2020/0249345 A1     Aug. 6, 2020

Related U.S. Application Data

(63) Continuation of application No. PCT/JP2018/040947, filed on Nov. 5, 2018.

(30) Foreign Application Priority Data

Nov. 10, 2017    (EP) .................................... 17201007

(51) Int. Cl.
*G01S 13/931* (2020.01)
*B60T 15/02* (2006.01)

(52) U.S. Cl.
CPC ............ *G01S 13/931* (2013.01); *B60T 15/02* (2013.01); *B60T 2250/03* (2013.01); *G01S 2013/93185* (2020.01); *G01S 2013/93271* (2020.01)

(58) Field of Classification Search
CPC ......... G01S 13/931; G01S 2013/93185; G01S 2013/93271; G01S 2013/932; G01S 7/415; B60T 2250/03; B60T 15/02
(Continued)

(56) References Cited

U.S. PATENT DOCUMENTS 6,018,308 A * 1/2000 Shirai .................... G01S 7/412
342/70
2008/0042894 A1 * 2/2008 Kikuchi ................ B60W 50/16
342/71
(Continued)

FOREIGN PATENT DOCUMENTS

DE    102004035577 A1 *  2/2006  ............ B60W 10/20
EP       0899543 A2 *  3/1999  ........... G01S 13/726
(Continued)

OTHER PUBLICATIONS

E. G. Pusone, et al. "Radar objects detection and imaging for ground-based vehicle collision avoidance: computer simulation results and safety aspects," 2007 Int. Conf. on Electromagnetics in Advanced Applications, Torino, 2007,doi:10.1109/ICEAA.2007. 4387309 (Year: 2007).*

(Continued)

*Primary Examiner* — Erin F Heard
*Assistant Examiner* — Alexander L. Syrkin
(74) *Attorney, Agent, or Firm* — Maschoff Brennan

(57) ABSTRACT

A detection method for detecting heading based on sensor data of a radar sensor is provided. The radar sensor provides sensor data in form of a range to range rate spectrum. Two clusters of spectrum cells or recognition points are determined. The spectrum cells or recognition points of a first cluster and a second cluster have an intensity value. The spectrum cells or recognition points of the first cluster are arranged on a first linear stretch. The spectrum cells or recognition points of the second cluster are arranged on a second linear stretch. A first slope gradient is determined for the spectrum cells or recognition points in the first cluster. A second slope gradient is determined for the spectrum cells or recognition points in the second cluster.

13 Claims, 3 Drawing Sheets

(58) Field of Classification Search
USPC .......................................................... 342/70
See application file for complete search history.

(56) References Cited

U.S. PATENT DOCUMENTS

| 2013/0110391 A1* | 5/2013 | Obi ........................ G01S 13/931 |
| --- | --- | --- |
| | | 701/400 |
| 2017/0097410 A1* | 4/2017 | Liu ........................ G01S 13/726 |

FOREIGN PATENT DOCUMENTS

| EP | 1418444 A1 * | 5/2004 | .......... B60T 8/17551 |
| --- | --- | --- | --- |
| EP | 3151034 A1 * | 4/2017 | .......... G01S 13/726 |
| EP | 3151034 A1 | 4/2017 | |
| JP | 2008267826 A * | 11/2008 | ............. B60R 21/00 |
| WO | WO-0150154 A1 * | 7/2001 | .......... G01S 13/931 |
| WO | 2019093261 A1 | 5/2019 | |

OTHER PUBLICATIONS

S. Clark and H. Durrant-Whyte, "Autonomous land vehicle navigation using millimeter wave radar," Proceedings. 1998 IEEE International Conference on Robotics and Automation (Cat. No.98CH36146), Leuven, Belgium, 1998, pp. 3697-3702 vol. 4, doi:10.1109/ROBOT.1998.681411. (Year: 1998).*

V. C. Chen, R. Lipps and M. Bottoms, "Advanced synthetic aperture radar imaging and feature analysis," 2003 Proceedings of the International Conference on Radar (IEEE Cat. No.03EX695), Adelaide, SA, Australia, 2003, pp. 22-29, doi: 10.1109/RADAR.2003. 1278704. (Year: 2003).*

C. R. Smith and P. M. Goggans, "Radar target identification," in IEEE Antennas and Propagation Magazine, vol. 35, No. 2, pp. 27-38, Apr. 1993, doi: 10.1109/74.207649. (Year: 1993).*

V. C. Chen and Hao Ling, "Joint time-frequency analysis for radar signal and image processing," in IEEE Signal Processing Magazine, vol. 16, No. 2, pp. 81-93, Mar. 1999, doi: 10.1109/79.752053. (Year: 1999).*

Y. D. Shirman, S. A. Gorshkov, S. P. Leshenko and V. M. Orlenko, "Aerial target backscattering simulation and study of radar recognition, detection and tracking," Record of the IEEE 2000 Int. Radar Conf. [Cat. No. 00CH37037], Alexandria, VA, USA, 2000, pp. 521-526, doi:10.1109/RADAR.2000.851888 (Year: 2000).*

* cited by examiner

[Fig. 1]
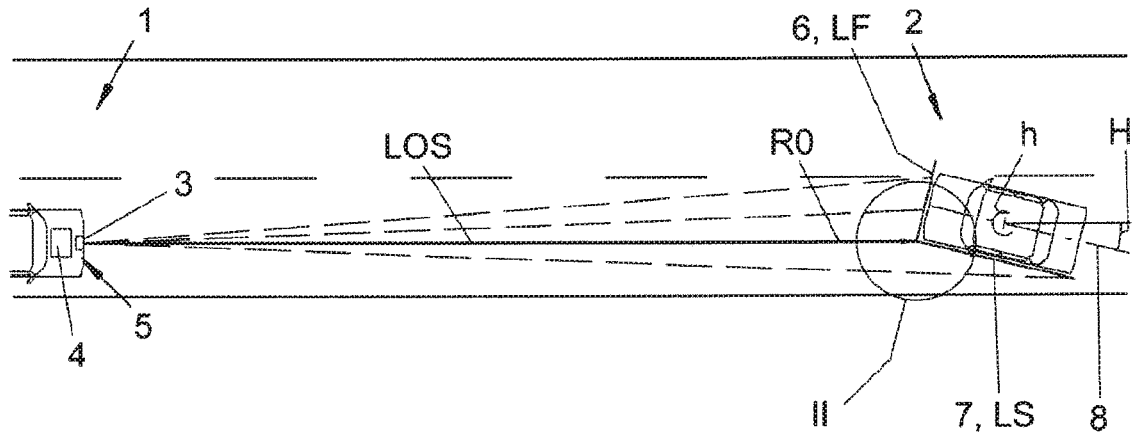
[Fig. 2]
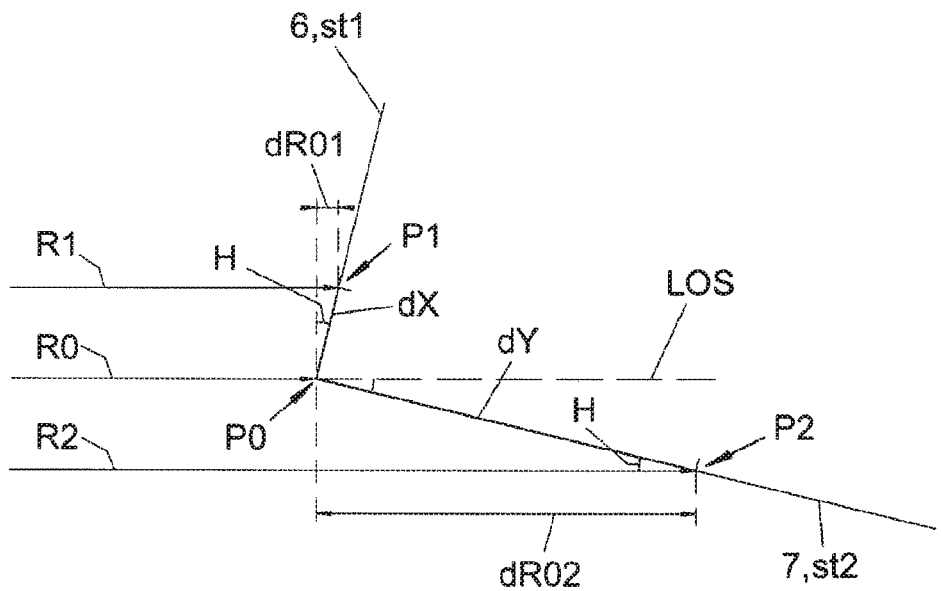
$$dR01 = dX \cos H \qquad dR02 = dY \sin H$$

[Fig. 3]
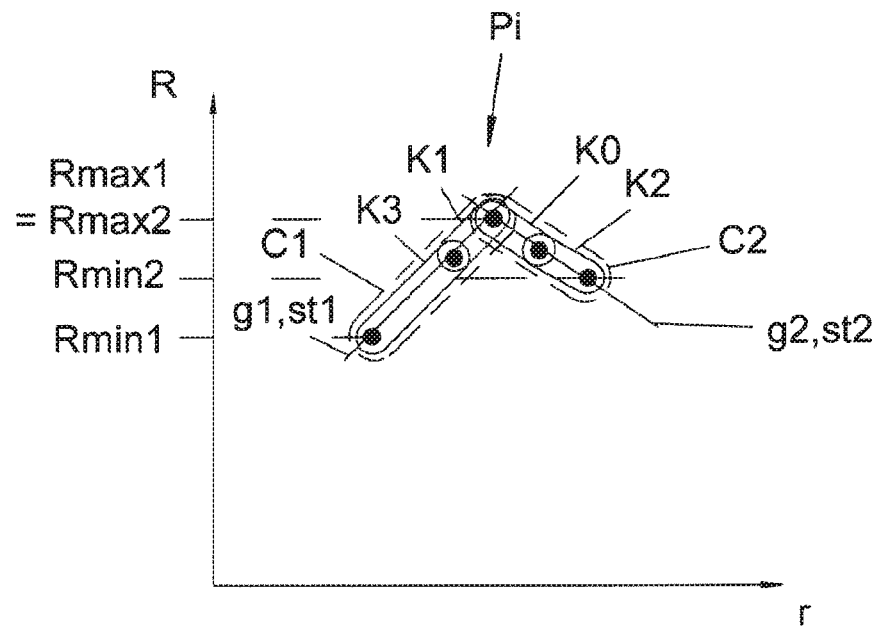
[Fig. 4]
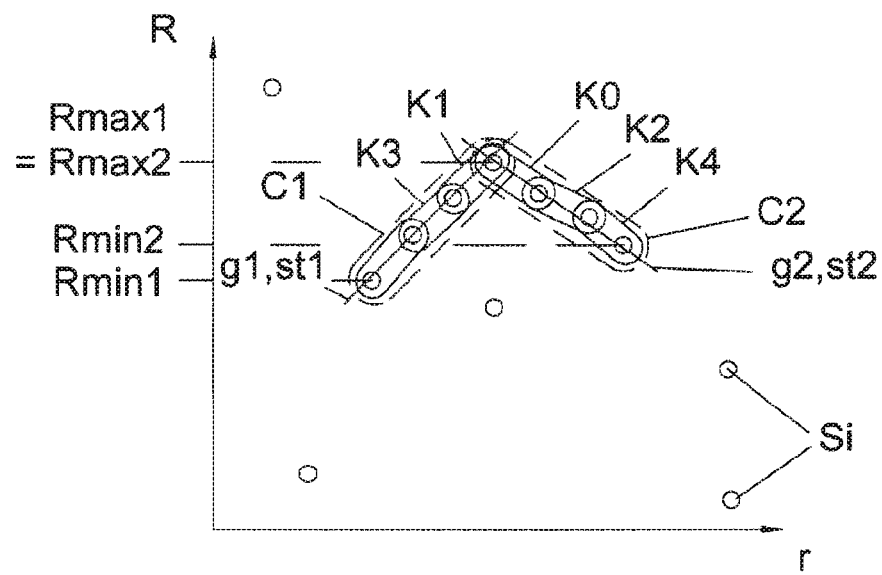

[Fig. 5]
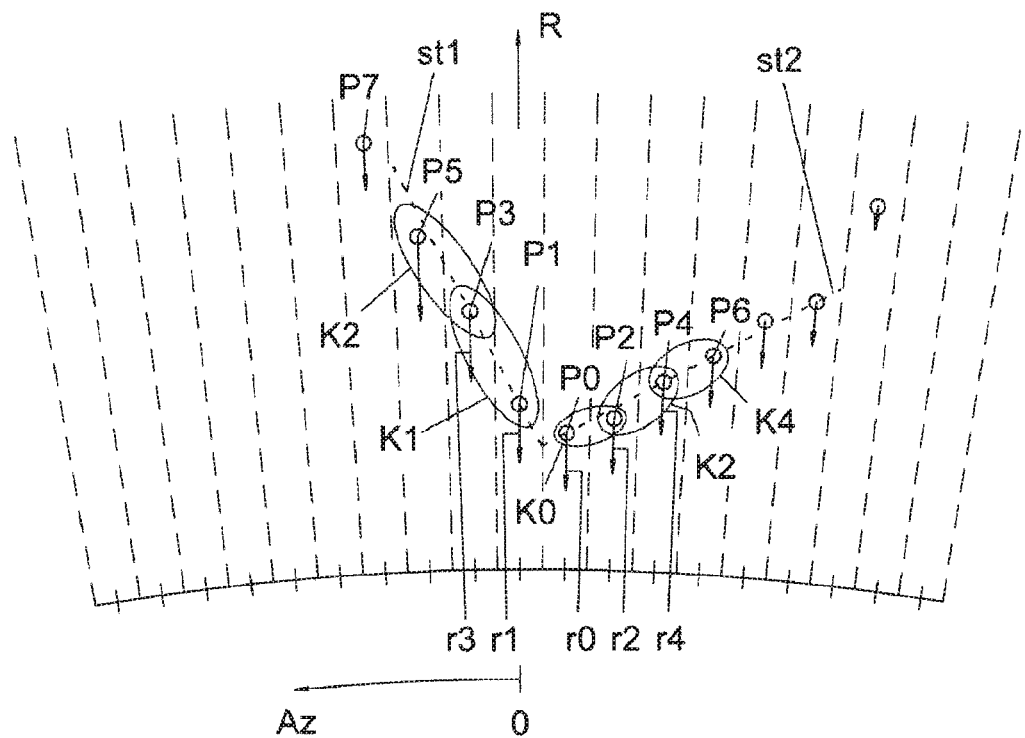
[Fig. 6]
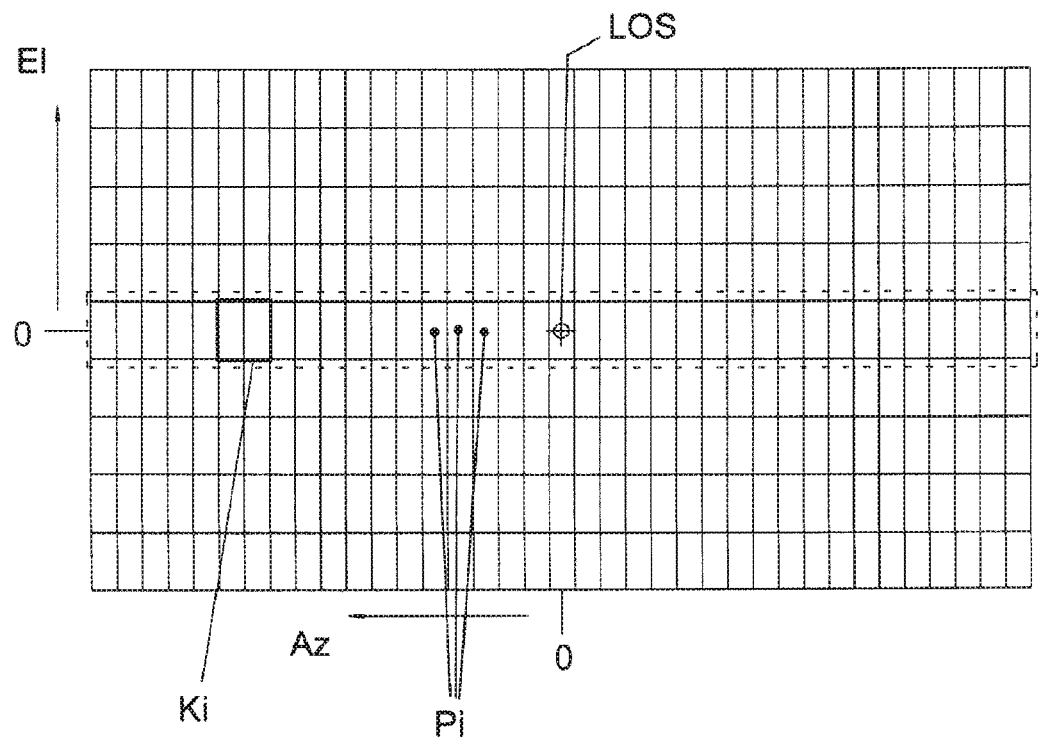

AUTOMOTIVE RADAR SYSTEM WITH DIRECT MEASUREMENT OF YAW RATE AND/OR HEADING OF OBJECT VEHICLE

CROSS REFERENCE TO RELATED APPLICATION

The present application is a continuation application of International Patent Application No. PCT/JP/2018/040947 filed on Nov. 5, 2018 which designated the U. S. and claims the benefit of priority from European Patent Application No. 17201007.6 filed on Nov. 10, 2017, the disclosure of which is incorporated herein by reference.

TECHNICAL FIELD

The present disclosure relates to a detection method for detecting the (instantaneous) yaw rate and/or heading of an object vehicle based on sensor data derived from a radar sensor which is mounted or mountable on an ego-vehicle.

BACKGROUND

Current tracking systems for estimating or detecting the position and movement of an object vehicle may require several consecutive measurements, based on sensor data from two or more sensors like camera and radar, to determine the heading (orientation of longitudinal axis) or yaw rate (rotation speed of longitudinal axis) of an object vehicle.

SUMMARY

The present disclosure describes a detection method for detecting a yaw rate h and/or a heading H of an object vehicle based on sensor data of a radar sensor mountable on an ego-vehicle, the sensor data being retrieved in a form of a range to range rate spectrum from the radar sensor.

BRIEF DESCRIPTION OF DRAWINGS

The foregoing and other advantages and features of the disclosure will become more apparent from the detailed description of the preferred embodiments of the disclosure given below with reference to the accompanying drawings in which:

FIG. 1 is a top view on an ego-vehicle with a radar detection device according to the present disclosure and an object vehicle, whose instantaneous yaw rate and/or heading are determined by the radar detection device;

FIG. 2 is an enlarged depiction of the section in FIG. 1, which is marked as II, for explaining relevant definitions forming a basis for the calculations of the present disclosure;

FIG. 3 is a range to range rate spectrum (Range-Doppler-Spectrum) with visualization of two clusters of recognition points, respectively having a common slope gradient;

FIG. 4 is a range to range rate spectrum analogous to FIG. 3, however comprising a visualization of two clusters of spectrum cells, respectively having a common slope gradient;

FIG. 5 is a schematic depiction of recognition points on the outer surface of the object vehicle of FIG. 1 in a top view, each recognition point comprising a measured range value and a measured range rate value; and FIG. 6 is a schematic depiction of a matrix with multiple recognition points.

DETAILED DESCRIPTION

Current tracking systems for estimating or detecting the position and movement of an object vehicle may require several consecutive measurements, based on sensor data from two or more sensors like camera and radar, to determine the heading (orientation of longitudinal axis) or yaw rate (rotation speed of longitudinal axis) of an object vehicle.

Recognition results from a first and a second object detection cycle may need to be compared for deriving the heading (orientation of longitudinal axis) of the object vehicle at a specific time which is usually several milliseconds or even seconds in the past. For safety-related features like collision avoidance or emergency braking, it would be helpful to determine the instantaneous movement of an object vehicle, in particular in a more accurate way and/or more quickly.

A related art describes such a method for detecting a yaw rate of a target vehicle based on recognition results from a first and a second object detection cycle, namely based on a present-range-rate and a present-azimuth and in combination with a prior-range-rate and a prior-azimuth.

The present disclosure describes an improved detection technique for detecting the heading and/or yaw rate of an object vehicle. The detection technique may comprise a detection method, a radar detection device and a software product containing instructions for performing the detection method.

According to one aspect of the present disclosure, a detection method for detecting the yaw rate h and/or the heading H of an object vehicle based on sensor data of a radar sensor mountable on an ego-vehicle is provided. The sensor data are retrieved in the form of a range to range rate spectrum from the radar sensor. The detection method comprises following steps: determining two clusters of spectrum cells or recognition points within the range to range rate spectrum, wherein the spectrum cells or recognition points of the first cluster have an intensity value above an intensity-threshold and are arranged on a first linear stretch and the spectrum cells or recognition points of the second cluster have an intensity value above the intensity-threshold and are arranged on a second linear stretch; determining a first slope gradient g1 for the spectrum cells or recognition points in the first cluster and a second slope gradient g2 for the spectrum cells or recognition points in the second cluster, wherein the slope gradients are defined as a ratio of a range difference to a range rate difference among the spectrum cells or recognition points in the respective cluster. At least one of following steps is performed: calculating the yaw rate of the object vehicle based on a function of the first slope gradient and the second slope gradient (h=f(g1, g2), in particular according to the following formula:

$$h = \pm \sqrt{\frac{1}{|g1 \times g2|}} \ ;$$

and/or calculating the heading of the object vehicle based on a function of the first slope gradient and the second slope gradient (H=f(g1, g2)), in particular according to the formula:

$$H = \pm \arctan\left(\sqrt{\left|\frac{g1}{g2}\right|}\right).$$

According to another aspect of the present disclosure, a radar detection device for a vehicle, comprising a radar sensor and a data processing device may be provided. The data processing device is designed to perform the detection method.

According to another aspect of the present disclosure, a software product storable on a physical data carrier may be provided, the software product comprising instructions for performing the detection method.

According to the present disclosure, it may be possible to detect the heading of an object vehicle (exclusively) based on sensor data derived from a radar sensor, which is able to provide both a measurement value for the range and the range rate (Doppler-frequency).

The detection of heading and yaw-rate of an object vehicle according to the present disclosure can be performed in parallel or before extraction of detections. The detection of heading and yaw rate may in particular be achieved by finding lines in the range to range rate spectrum and then output an extended (box) detection (not points) with information on position, length/width, orientation, yaw rate and (mean) range rate.

The detection technique according to the present disclosure can directly process input data in the form of a range to range-rate spectrum. It can thus be performed very quickly and the determined yaw rate and/or heading information may be provided within a very short time delay after receiving the reflected radar signals. This allows to use the heading and/or yaw rate much quicker for deciding on a collision avoidance scheme, a breaking scheme et cetera, i.e. for controlling driver assistance functions for active safety.

The disclosure concerns a radar detection technique for detecting the heading H and/or yaw rate of an object vehicle 2 based on sensor data of a radar sensor 3 which is mounted or mountable on an ego-vehicle. FIG. 1 shows a top view on an ego-vehicle 2. The ego-vehicle is equipped with a radar detection device 5 comprising at least one radar sensor 3 and a data processing device 4 (corresponding to ECU) receiving measurement data from the radar sensor. The data processing device 4 is designed to perform the detection method according to the present disclosure and eventually additional processing. The data processing device 4 may perform a pre-processing for converting received radar signals into a range to range rate spectrum. In may furthermore determine relevant spectrum cells, in which a measured intensity is above a (pre-defined) intensity threshold.

The detection method according to the present disclosure is based on mathematical definitions and calculations which are now explained taking reference to FIGS. 1 and 2.

The ego-vehicle 1 is a land vehicle, in particular an automobile. The ego-vehicle may comprise one or several driver assistance systems, in particular a collision avoidance system, which may control steering, braking and/or propulsion of the ego-vehicle in a near-crash situation.

The ego-vehicle 1 may comprise further environment monitoring equipment, like one or several vision sensors, LiDar sensors etc. and an object recognition device, which is designed to recognize foreign objects in the environment of the ego-vehicle based on the sensor data of the radar sensor 3 and or the further environment monitoring equipment. The object recognition device may be integrated with the radar detection device 4 or be a separate device.

The object recognition device and/or the radar detection device 4 is designed to perform one or more object recognition processes and one or more tracking processes. In the situation depicted in FIG. 1, it is assumed that the object vehicle 2 is already noticed by the object recognition device and/or the radar detection device 4 as a land vehicle, whose position and/or movement relative to the ego-vehicle is tracked.

The future position and/or movement of the object vehicle 2 may be anticipated by suitable algorithms, based on the current and prior position and movement.

The wording "instantaneous" position, movement etc. means within the present disclosure the position, movement etc. "in the moment of performing a radar scan" with the radar sensor 3 covering the object vehicle 2, in particular "in the moment of performing a single radar scan". A future position and/or movement may be calculated based on the last position, movement etc., i.e. the position or movement which was directly detected based on sensor data in the last time step/detection cycle or which was calculated as an anticipated position or movement in a prior time step and confirmed in the last time step based on sensor data of the radar sensor 3 or the environment monitoring equipment in the last time step.

The position, movement, or the like of the object vehicle may be detected/confirmed every one or several milliseconds. Anticipation of the future position or movement of the object vehicle may cover several milliseconds to seconds into the future. The prior position or movement of the ego-vehicle 1 and the object vehicle 2 may be known as stored data for a time interval of several milliseconds up to several seconds or longer.

In the situation of FIG. 1, the ego-vehicle 1 and the object vehicle 2 have a collision risk. It may be assumed that the object vehicle 2 has entered the lane of the ego-vehicle 1, for example, for an overtaking procedure, and is now on a collision course with the ego-vehicle.

In such a situation it is highly important to have up-to-date information about the instantaneous position, heading and/or yaw rate of the object vehicle 2, in order to trigger helpful collision avoidance measures at the ego-vehicle 1.

The front side 6 and the left long side 7 of the object vehicle 2 include an angle of about 90 degrees which is utilized for the following calculations. The detection technique according to the present disclosure may also be performed if the angle between a front/back side of an object vehicle and a right/left side is not equal to 90 degrees, but known, for example, from previous object recognition. The front side 6 may be a rear side.

The radar sensor 3 defines a line of sight direction LOS, which is for example a direction perpendicular to the sensor plane of a planar radar sensor or any other direct line from the radar sensor to the object vehicle. The radar sensor 3 may be arranged in such a way on the ego-vehicle 1, that line of sight direction LOS is parallel to the longitudinal direction of the ego-vehicle 1.

The radar sensor 3 may send a radar signal and receive a reflected radar signal with multiple antenna elements, in particular one or two sending antenna elements and 4, 6, 8, 10 or more receiving antenna elements. Alternatively, any other number or sending and receiving antenna elements may be used.

From the various received radar signals, a range to range rate spectrum may be calculated, wherein the range to range rate spectrum comprises a multiplicity of spectrum cells, each containing at least a range value and a range rate value, and preferentially furthermore an intensity value. If the intensity value of a spectrum cell is above a (pre-defined) intensity threshold, it may be determined as a relevant spectrum cell.

For the following example, it is assumed that only such spectrum cells are considered, which are relevant and already attributed to the object vehicle 2.

A point, where a radar signal is reflected, may be identified as a recognition point Pi. A recognition point Pi usually has an Elevation coordinate El and an Azimuth coordinate Az to define at what horizontal (Azimuth) or vertical (Elevation) angle with respect to the bore sight direction the recognition point Pi was identified.

For each recognition point Pi a range value R and a range rate value r are known. The range value R specifies the radial distance between the radar sensor 3 and the recognition point Pi. It is usually calculated based on the time-of-flight of a received radar signal. The range rate value r specifies the radial speed of a recognition point towards the radar sensor 3. It is usually calculated based on the Doppler effect, i.e. a frequency shift between the sending signal and a received radar signal. The range rate r may also be called Doppler-speed.

The heading H of the object vehicle 2 may be defined as an angle between the longitudinal axis 8 of the object vehicle 2 and the line-of-sight direction LOS. The yaw rate h is defined as the rotation speed of a self-rotation of the object vehicle 2. With other words, the yaw rate h is the time derivative of the Heading H:

$$h := \frac{\partial}{\partial L} H.$$

FIG. 2 shows an enlarged section II of FIG. 1. Several points on the front side 6 and the left long side 7 of the object vehicle 2 are noticed by the radar detection device 5 as recognition points P0, P1, P2. FIG. 2 describes dR01=dX cos H and dR02=dY sin H.

For simplified illustration of the mathematical equations, recognition point P0 is here situated on the edge between the front side 6 and the left long side 7 of the object vehicle 2 and it is used in two calculations for determining a range difference dR. However, the detection method of the present disclosure is not limited to such a situation.

The range value R0 specifies the measured radial distance between the radar sensor 3 and the recognition point P0. The range values R1, R2 respectively specify the measured radial distances between the radar sensor 3 and the recognition points P1, P2.

Two recognition points P0, P1 are situated on the front side 6 and are distanced by a stretch dX in the direction of the front side 6, wherein dX may have any arbitrary value. Two recognition points P0, P2 are situated on the left long side 7 and are distanced by a stretch dY in the direction of the left long side 7, wherein dY may also have any arbitrary value. The stretches dX, dY are only used for illustration purposes and as an auxiliary parameter for explaining the mathematical equations, but they are neither measured parameters, nor required for performing the calculations. The stretches dX, dY may have the same or a different length, i.e. the recognition points P0, P1, P2 may be situated anywhere on the front side 6 and the left long side 7 of the object vehicle 2. In the present case, it is assumed that the stretches dX, dY are each much smaller than the range value R0, R1, R2 of the recognition points. In the example of FIGS. 1 and 2, the stretches dX, dY may for example have a length of below one centimeter or a few centimeters, whereas the range values R0, R1, R2 may have a length of one or several meters. So it is assumed that the lines, representing the radial connections from a recognition point P0, P1, P2 to the radar sensor 3 are approximately parallel to each other and in particular parallel to the line of sight direction LOS. The same approximation applies to any other set of recognition points or spectrum cells, which are—in comparison to the range value-situated in close proximity to each other.

So, it is generally assumed:

$dX \ll Ri;$ and $dY \ll Ri.$

As has been expressed above, the front side 6 and the left long side 7 of the object vehicle 2 include an angle of approximately 90 degrees. As a basic assumption, the angle between each of the front side, left long side and right long side and as well the angle between each of the back side, the left long side and the right long side of the object vehicle is 90 degrees.

As a result, the range difference dR01 between the range value R0 of a first recognition point P0 and the range value R1 of a second recognition point P1 can be expressed as:

$dR01 = dX \cdot \cos(H).$

The first time derivative of this equation is:

$$dr01 = \frac{\partial}{\partial t} dR01 = -h \cdot dX \cdot \sin(H)$$

wherein the range rate difference dr01 is the difference between the range rate values r01, r02 of the recognition points P01, P02.

A slope gradient g1, g2 is defined as a ratio between the range difference dR and a range rate difference dr of recognition points P0, P1, in particular as a ratio between the range difference dR and a range rate difference dr of a pair of recognition points P0, P1.

Building the slope gradient g1 for recognition point P0, P1 based on the last two equations gives following relation:

$$g1 = \frac{dR01}{dr01} = -\frac{1}{h \cdot \tan(H)}$$

Likewise, a range difference dR02, a range rate difference dr02 and a slope gradient g2 can be defined for further recognition points P0, P2 on the left long side 7 of the object vehicle, which gives following formulae:

$$dR02 = dY \cdot \sin(H);$$

$$dr02 = \frac{\partial}{\partial t} dR02 = h \cdot dY \cdot \cos(H); \text{ and}$$

$$g2 = \frac{dR02}{dr02} = \frac{1}{h} \tan(H).$$

A ratio of the slope gradients g1/g2 gives following equation:

$$\frac{g1}{g2} = -\tan^2(H).$$

Solving this equation to the heading H, gives following result:

$$H = \pm \arctan\sqrt{\left|\frac{g1}{g2}\right|}.$$

Taking reference to FIG. 2, the slope gradients g1, g2 can be determined based on the radar sensor data from a single radar scan and at least two pairs K1, K2 of recognition points P0-P1, P0-P2 as follows:

$$g1 = \frac{R0 - R1}{r0 - r1}; \text{ and}$$

$$g2 = \frac{R0 - R2}{r0 - r2}$$

The same applies for a calculation using the range values and range rate values of linearly aligned spectrum cells, which will explained further below.

Instead of the recognition points P0, P1, P2 specified in FIG. 2, any other pair or cluster of recognition points, which are arranged on either a front/back side of an object vehicle, or a left/right long side of an object vehicle can be used for determining the slope gradients g1, g2.

Based on above equations it is possible to determine the heading H of an object vehicle 2 directly from the sensor data from a single radar scan. With other words, determination of the two clusters C1, C2 may preferentially be performed among spectrum cells Si or recognition points Pi, P0, P1, P2 from a single radar measurement/the same radar measurement.

The sign ambiguity in determination of the heading H may be resolved based on azimuth measurements or previous target states from object tracking/object recognition. For example, if a heading of the object vehicle 2 was identified during object tracking in previous time steps with values of +9 degrees, +10 degrees, +12 degrees with respect to the line-of-sight direction LOS, and the instantaneous heading H is calculated based on the present radar measurement with +/−13.5 degrees, it would be clear that the positive value of +13.5 degrees is selected as the correct value.

If the instantaneous heading H has a trend towards 0 degrees or 90 degrees, usually one of the perpendicular sides of the vehicle will become invisible to the radar sensor. As a result, it may not be possible to identify two clusters C1, C2 of recognition points Pi any more. Consequently, the sign ambiguity will in most cases be easy to solve.

It is also possible, to calculate the yaw rate h of the object vehicle 2 directly based on the determined slope gradients g1, g2, in particular based on the product of the slope gradients. The product of the slope gradients g1/g2 gives following equation:

$$g1 \times g2 = -\frac{1}{h^2}$$

Solving this equation to the yaw rate h, gives following result:

$$h = \pm \sqrt{\frac{1}{|g1 \times g2|}}$$

FIG. 3 shows a diagram for illustrating a range-to-range rate spectrum, which may also be called a range-Doppler spectrum. It is a histogram, in which all (relevant) recognition points Pi are sorted according to the respective range value R and range rate value r. In the given example, the abscissa (x-axis) shows the range-rate values r with increasing amount to the right and the ordinate (y-axis) shows the range values R with increasing amount to the top.

If two sides of a rotating vehicle are visible to the radar sensor (comp. FIG. 1), two inclined and strip-shaped clusters C1, C2 of recognition points appear in the range-to-range rate spectrum. Those strip-shaped clusters C1, C2 may also be called "slopes". It is beneficial for a robust detection of the heading H and/or yaw rate h, if both clusters C1, C2 comprise multiple pairs Ki or recognition points Pi.

Both of the visible sides 6, 7 may have a length LF, LS. The heading H of an object vehicle 2 can be calculated by finding those clusters C1, C2, calculating the slope gradients g1, g2 for each of the clusters C1, C2 or the respective pairs Ki of recognition points Pi constituent for the clusters C1, C2, and (optionally) by confirming that the recognition points Pi in each of the clusters C1, C2 belong to one of the (approximately) perpendicular visible sides 6, 7 of the object vehicle 2.

Further below, several approaches will be explained for determining the clusters C1, C2 and/or pairs Ki and/or for confirming the relation to the perpendicular sides 6, 7 of the object vehicle 2.

Once the instantaneous heading H is determined, based on above equation, also the instantaneous yaw rate h can be calculated based on one of the determined slope gradients g1, g2 and the determined Heading H in particular according to one of the formulae:

$$h = \pm \frac{1}{g1\tan(H)}; \text{ and}$$

$$h = \mp \frac{1}{g2\cot(H)}$$

Also here, the sign ambiguity may easily be solved based on azimuth measurements or previous target states from object tracking/object recognition.

In FIG. 1, the length of the visible front side 6 is indicated as "LF" and the length of the visible left side 7 is indicated as "LS". Each cluster C1, C2 of recognition points Pi in FIG. 3 comprises both a recognition point with a maximum range value Rmax1, Rmax2 and a recognition point with a minimum range value Rmin1, Rmin2. Those "maximum and minimum points" can often be attributed to the near end and the far end of the visible sides 6, 7 of the object vehicle 2, respectively. As a consequence, the length LF, LS of the respective vehicle side 6, 7 can be estimated based on a difference among the maximum range value Rmax1, Rmax2 and the minimum range value Rmin1, Rmin2 among the recognition points P0, P1, P2, P3 within one of the clusters C1, C2 and the (previously) determined heading H of the object vehicle 2, in particular according to one of the formulae:

$$LF = \frac{R\max 1 - R\min 1}{\cos(H)}; \text{ and}$$

$$LS = \frac{R\max 2 - R\min 2}{\sin(H)}$$

The aforementioned calculations can be performed directly on a range to range rate spectrum, even if there is no knowledge about the elevation values and/or azimuth values and/or no attribution of a tuple of range value and range rate values to the object vehicle 2.

FIG. 4 shows a range to range rate spectrum, in which relevant spectrum cells (i.e. intensity value is above intensity threshold) are mapped according to their range value and range rate value. The spectrum of FIG. 4 includes all spectrum cells, which were included in FIG. 3 as recognition points, as they were attributed to the object vehicle 2. However, the spectrum of FIG. 4 includes even further spectrum cells Si.

Also among the spectrum cells in the range to range rate spectrum of FIG. 4, it is possible to identify two clusters C1, C2 of linearly arranged (relevant) spectrum cells, wherein the spectrum cells of the first cluster C1 are arranged on a first linear stretch st1 and the spectrum cells of the second cluster C2 are arranged on a second linear stretch st2.

The clusters can be identified by any suitable method, in particular by applying a suitable algorithm for finding linearly clustered tuples in a distribution.

A suitable additional condition in the detection method may be that the first stretch st1 and the second stretch st2 form a V-shape. This condition can avoid that two separate visible linear surfaces in the field of view of the radar sensor, which actually belong to different real objects, are misinterpreted as the approximately perpendicular sides of a single object-vehicle.

Furthermore, the V-shape condition can be utilized already in searching the clusters C1, C2, wherein the range R to range rate r spectrum is searched for two linear stretches st1, st2 forming a V-shape with an image recognition method.

The speed and/or precision of the detection method may furthermore be increased by posing conditions to the clustering. As an example, (only) such spectrum cells or recognition points may be identified for clustering, which are arranged exactly on one of the two stretches st1, st2 or which have a lateral distance to one of the two stretches st1, st2, which is below a (pre-defined) distance threshold. The distance threshold may be adaptable, in particular in a step-by-step approach, so that in an initial run two exactly linear arrangements of spectrum cells or recognition points are searched for. In a second run, also slightly bent or rippled but mainly linearly formed distributions may be searched for. At least one of the stretches st1, st2 may then be determined by calculating a best fit line within the spectrum cells Si or recognition points Pi of a cluster C1, C2.

The robustness of the detection method can be improved by several measures. For example, it is beneficial to confirm that the recognition points or spectrum cells within each of the clusters C1, C2 are likely to belong to one of the visible sides 6, 7 of an object vehicle. If there is only one object vehicle or a known number of object vehicles present within the vision field/detection field for the radar sensor 3, the recognition points Pi or spectrum cells Si in the clusters C1, C2 should have range values which differ from the known position of such object vehicle less than a specified position difference threshold.

It may be sufficient to sort all recognition points Pi or spectrum cells according to their range and range rate values (R, r) and to check, whether two strip-shaped clusters C1, C2 of recognition points Pi or spectrum cells can be found. This could for example be done by a comparison algorithm, which compares all recognition points Pi among each other. Multiple pairs Ki can be formed from any combination of two recognition points or two spectrum cells. For each pair the range difference dR, the range rate difference dr and thus a slope gradient can be calculated. In doing so, every combination among the available recognition points or spectrum cells could be checked, thereby building a matrix of pairs Ki with respective slope gradient value. If there are several pairs (K1, K3 vs. K0, K2, K4), whose slope gradients are equal or essentially equal, they may be selected as a cluster C1, C2.

Calculating all possible range differences dR and all range rate differences dr among all available recognition points or spectrum cells may however be time-consuming.

So it may be beneficial to perform proximity analysis based on the proximity of range and range rate coordinates of the recognition points or spectrum cells, and to calculate the slope gradient only for such pairs, which include a first (arbitrarily) selected recognition point Pi or a first (arbitrarily) selected spectrum cell in a combination with the first, second, third or n-th closest recognition point Pi or spectrum cell, wherein proximity (closeness) means highest similarity among the range and range rate coordinates.

Alternatively or additionally a subset from the available recognition points Pi or spectrum cells Si may be pre-selected and the two clusters C1, C2 may exclusively be determined within the pre-selected subset. Determination of the sub-set may be done in any arbitrary way, in particular based on a pre-defined selection rule and/or based on prior results from object recognition and/or tracking. At least one of the stretches st1, st2 may be determined by calculating a best fit line within a pre-selected set of spectrum cells Si or recognition points Pi.

For example, such recognition points or spectrum cells may be included in a subset, which are attributed (based on their Azimuth and Elevation coordinate or based on their range or range rate value) to a previously tracked or recognized object vehicle 2, in particular an object vehicle 2 with increased likeliness for a collision with the ego-vehicle 1.

Again alternatively or additionally, recognition points or spectrum cells may be chosen for a subset based on common Elevation coordinates El, i.e. belonging to the same or neighboring azimuth plains. This is explained with reference to FIGS. 5 and 6.

FIG. 5 shows a cell-arrangement for sorting all recognition points Pi according to their Azimuth- and Elevation coordinate (Az, El), i.e. their angular distance from the bore sight direction LOS in horizontal and vertical direction. In this cell-arrangement, all recognition points Pi, whose elevation coordinate El is equal or within a specified range, belong to an azimuth plain 9. In FIG. 6, an azimuth plain 9 is marked covering all recognition points with essentially common elevation coordinate (El=0), in particular in a horizontal plain with the same elevation level as the ego-vehicle.

FIG. 5 illustrates the recognition points Pi in this azimuth plain 9. Each of the recognition points Pi has a range value R and a range rate value r. The recognition points Pi for a pair Ki may be selected as direct neighboring points, $2^{nd}$ neighboring points or $3^{rd}$ neighboring points within this azimuth plain 9. As an example, pairs Ki may be formed (from left to right) of following points:

(P7+P5), (P7+P3), (P7+P1);
(P5+P3), (P5+P1), (P5+P0);
(P3+P1), (P3+P0), (P3+P2);
(P1+P0), (P1+P2), (P1+P4);
(P0+P2), (P0+P4), (P0+P6); and so on.

For each of those pairs the slope gradient can be calculated. In the example of FIG. 4, the slope gradients for following pairs are essentially equal; so that those pairs qualify for creating a cluster (only direct neighbors are marked in the Figure as pair):

For cluster C1:
(P7+P5),
(P7+P3),
(P7+P1),
(P5+P3), indicated as K2
(P5+P1)
(P3+P1), indicated as K1.

For cluster C2:
(P0+P2), indicated as K0
(P0+P4),
(P0+P6),
(P2+P4), indicated as K2
(P2+P6),
(P4+P6), indicated as K4.

Building pairs of recognition points Pi in an azimuth plain 9, i.e. calculating the range differences and range rate differences in horizontal slices of the provided radar measurement data, may grant a drastic speed gain for determining pairs with essentially equal slope gradient g1 and thus identifying a cluster C1. The calculation may be performed in parallel or consecutively for two or more azimuth plains.

There may be a situation, where a first cluster C1 is identified on a first azimuth plain, for example, at elevation angle of −1 degree to +1 degree, and a second cluster C2 is identified on a second azimuth plain, for example, at elevation angle of +1 degree to +3 degree.

Modifications of the disclosure are possible in various ways. Identification of the clusters (C1, C2) may be achieved with other algorithms, for example, with a known image recognition algorithm that is applied to the range-to-range rate spectrum.

A first or initial step may be to select the range/range rate data belonging to a certain object vehicle. If no prior information is available, this would be done by a clustering algorithm, i.e. finding the subset(s) of all relevant cells in range/range rate space which are "connected" by a minimum distance in both values to the nearest neighboring cell. By "relevant" is meant that the reflection intensity for the cell exceeds a specified threshold. This is typically done by starting with a random cell and checking if there is at least one nearby cell(s) with difference below the specified thresholds. If this is true, this at least one spectrum cell is included in the cluster. Then the same check is done for the at least one added cell, in particular an outermost added cell of the spectrum. The checks may be performed until no more cells can be added to the cluster or until another break-condition is reached, for example, that no sufficient linearity can be determined in the cluster. In the same way, a second cluster may be aggregated. Alternatively, only one cluster may be found, which is then divided into two clusters, each containing a linear distribution of contained spectrum cells.

A second or further step may be to fit two lines to the cluster(s) from the previous step, in particular with a corner (crossing point) between them at the closest range value. To estimate each line, an ordinary least squares fitting method may be employed to extract the linear coefficients. It may use following equation for a best fit line:

$$(r_i = k + s\dot{r}_i).$$

The coefficients k and s may be found by following formula:

$$[k,s] = (D^T w D)^{-1} D^T w r$$

where D is the equation matrix with ones in the first column and "dot accented r" values in the second, r is the corresponding range values and w $(w_1 \ldots w_n)$ is the weight of each cell given by the reflection intensity. Possibly, this process could be done iteratively, moving points around the corner from one line to the other to find an optimal solution for both lines.

In the description and the drawings, the term for Az may be azimuth coordinate of recognition point. The term for C1 may be a first cluster of spectrum cells/recognition points. The term for C2 may be a second cluster of spectrum cells/recognition points. The term for dr may be a range rate difference among range rate values of two spectrum cells/recognition points. The term for dR may be a range difference among range values of two spectrum cells/recognition points. The term for dR01 may be a range difference between P0 and P1. The term for dR02 may be range difference between P0 and P2. dX may be a stretch between two points (P0 and P1) in transversal direction of object vehicle (auxiliary dimension). The term for dY may be a stretch between two points (P0 and P2) in longitudinal direction of object vehicle (auxiliary dimension). The term for g1 may be slope gradient for spectrum cells or recognition points in first cluster C1/common slope gradient of pairs within first cluster C1. The term for g2 may be a slope gradient for spectrum cells or recognition points in second cluster C2/common slope gradient of pairs within second cluster C2. The term for h may be a yaw rate/Heading rotation rate of object vehicle. The term for H may be a heading of object vehicle (angle of longitudinal axis vs. line of sight). The term for El may be elevation coordinate of recognition point. The term for Ki may be a pair of spectrum cells/recognition points. The term for LOS may be a line-of-sight direction. The term for Pi may be a recognition point. The term for r may be a range rate of a spectrum cell or recognition point (value derived from radar sensor). The term for R may be a range of a spectrum cell or recognition point (value derived from radar sensor). The term for R0 may a range of S0/zP0. The term for R1 may a range of S1/P1. The term for R2 may be a range of S2/P2. The term for Rmax1 may be a maximum range value among spectrum cells or recognition points within first cluster C1. The term for Rmax2 may be a maximum range value among spectrum cells or recognition points within second cluster C2. The term for Rmin1 may be a minimum range value among spectrum cells or recognition points within first cluster C1. The term for Rmin2 may be minimum range value among spectrum cells or recognition points within second cluster C2. The term for Si may be a spectrum cell. The term for st1 may be a first stretch. The term for st2 may be a second stretch.

Aspects of the disclosure described herein are set forth in the following clauses. The detection method according to the present disclosure is able to detect the heading of an object vehicle (exclusively) based on sensor data derived from a radar sensor, which is able to provide both a measurement value for the range and the range rate (Doppler-frequency). The radar sensor may have any suitable construction. It may in particular comprise a planar radar antenna with several patch-based antenna elements, which are arranged in a side-by-side pattern on a substrate. It is known in practice that such radar sensors may provide sensor data for various spectrum cells or recognition points with an Azimuth coordinate and eventually an Elevation coordinate.

The traditional output from a radar sensor system is a set of "detection points" with azimuth/elevation, range, and range rate. These points are typically extracted by finding peaks in the range/range rate distribution. This approach is quite appropriate for objects or parts of objects (point reflectors) that only occupy one or a few range/range rate cells each, but is not so good when the object give rise to an extended distribution in either range or range rate or both. A common example is the distribution from a helicopter, in which case the rotor will give rise to a "line" parallel to the range rate axis.

"Spectrum cells" in a range to range rate spectrum may only comprise a range value and a range rate value but no information on azimuth and/or elevation.

In the present case of vehicle traffic, when the object vehicle is moving straight, a distribution in range will occur, and whenever it is turning, a distribution both in range and range rate will occur. This distribution, both in range and range rate, can be exploited for performing the detection technique according to the present disclosure by directly and exclusively processing the range and range rate information, i.e. processing spectrum cells rather than detection points.

Of course there is always a risk of objects at similar range and with similar range rate to be mixed up, this is also true for points, but with a good enough resolution, this risk is generally considered small.

The detection of heading and yaw-rate of an object vehicle according to the present disclosure can be performed in parallel or before extraction of detections. The detection of heading and yaw rate may in particular be achieved by finding lines in the range to range rate spectrum and then output an extended (box) detection (not points) with information on position, length/width, orientation, yaw rate and (mean) range rate. Finding the lines may for example be done by using the Hough transform, in particular for finding two connected lines in the range to range rate spectrum, forming a V shape. This will be explained in more detail below.

The basic functionality of a radar sensor is known. A radar signal is emitted from at least one antenna and reflected by physical surfaces in the surrounding of the ego-vehicle. Reflected radar signals are received at the radar sensor, in particular by a multiplicity of receiving antennae, each antenna providing a single received signal. From differences among the various received signals both a range-value and a range-rate value can be calculated. A radar sensor may in particular provide both the range value and the range rate value for a multiplicity of (pre-defined) spectrum cells. With other words, the range to range rate spectrum may be an initial output of a radar sensor or radar sensor system. Additionally, an intensity value may be provided for each spectrum cell, indicating the intensity at which a reflected signal was received. The sampling rate may define the resolution for range rate and range. A relevant spectrum cell is a spectrum cell in which the intensity value is above a pre-defined intensity-threshold.

In the present disclosure, it is differentiated between on the one hand "basic processing" or "pre-processing" of radar sensor data and on the other hand "recognition processing" of radar sensor data. "Basic processing" or "pre-processing" comprises converting received sensor signals into range and range rate information, plus preferentially intensity information for a multiplicity of spectrum cells. The result of pre-processing is a range to range-rate spectrum of a single radar measurement. This pre-processing can be performed very quickly upon receiving the reflected radar signals, for example—depending on the computational performance—within less than 10 milliseconds or less than 100 milliseconds.

Based on the received range, range rate and intensity values, the "recognition processing" may be performed for recognizing object points in the surrounding of the ego-vehicle and, maybe, furthermore for attributing such object points to real objects, like one or several object vehicles. The detection method according to the present disclosure is preferentially performed after the pre-processing and in parallel to or, maybe, before recognition processing. In particular, output information of the detection method may be used in the recognition processing to improve or speed up the recognition.

The calculations performed for "recognition processing" may use the results of pre-processing of a current radar measurement in combination with the results of pre-processing of previous radar measurements. In addition, more aggregated information may be used, like already recognized objects in the surrounding, their size, absolute or relative position et cetera.

Any calculation that is based on "recognition points", can only be started, after the pre-processing and a first recognition processing are completed, i.e. with a significant time delay compared to calculations that directly use the range to range-rate spectrum or respectively the spectrum cells.

The detection technique according to the present disclosure can directly process input data in the form of a range to range-rate spectrum. It can thus be performed very quickly and the determined yaw rate and/or heading information may be provided within a very short time delay after receiving the reflected radar signals, in particular within less than 20 milliseconds or less than 200 milliseconds. This allows to use the heading and/or yaw rate much quicker for deciding on a collision avoidance scheme, a breaking scheme et cetera, i.e. for controlling driver assistance functions for active safety.

Alternatively or additionally the method according to the present disclosure may process input data in the form of recognition points, wherein for each recognition point a range value and a range-rate value are available. Using recognition points as a basis for the calculations may lead to a time delay. However, the sureness of a correct yaw rate and/or heading detection may be increased and it may at a distinct level of certainty be attributed to a real object, in particular an object vehicle. In particular, the method may be performed based on recognition points in order to double-check a heading or yaw-rate information that was prior detected based on spectrum cells.

In both cases of processing spectrum cells and recognition points, the input data comprise a multiplicity of tuples containing at least each a range value and a range rate value, i.e. information about radial distance and radial speed with respect to the ego-vehicle/the radar sensor. Additionally, in case of using recognition points, a tuple may comprise an associated azimuth angle value and/or an associated elevation angle value, i.e. information about a horizontal and/or a vertical position with respect to the ego-vehicle/a radar sensor.

The detection technique according to the present disclosure does not require that any information about a horizontal and/or vertical position is available. However, the method may be understood more easily, when it is explained based on an example, in which such position information is available. For this reason, the method will initially be explained based on an example using recognition points. Thereafter, the more general calculation based on spectrum cells will be explained.

Within the sensor data of the radar sensor two clusters of linearly arranged recognition points are determined, in particular two connected lines forming a V-shape, wherein the connection may be required to be the point with a lowest range value. The recognition points in the first cluster have a first essentially common slope gradient and the recognition points in the second cluster have a second essentially common slope gradient, which differs from the first slope gradient. A best fit line may be drawn through the recognition points or spectrum cells in the first cluster and/or in the second cluster. The best fit line may be calculated based on the range rate and range values representing an abszissa (x-coordinate) and an axis of ordinates (y-coordinate) of an orthogonal spectrum.

For the sake of readability, the following definitions are given with a relation to "recognition points". However, those definitions are likewise valid for a relation to "spectrum cells".

A slope gradient is defined as a ratio between the range difference and a range rate difference of recognition points. A range difference is a difference between the range of a first recognition point and the range of a second recognition point within a cluster. The same applies for the range rate difference, i.e. it is a difference between the range rate of the first recognition point and the range rate of the second recognition point in a cluster.

The heading is calculated based on a function of the first slope gradient and the second slope gradient, in particular the ratio (i.e. fraction) of the first slope gradient and the second slope gradient. It is particularly preferred that the following formula is used:

$$H = \pm \arctan\left(\sqrt{\left|\frac{g1}{g2}\right|}\right)$$

wherein H is the heading and g1 and g2 are the first slope gradient and the second slope gradient.

The yaw rate is calculated based on a function of first slope gradient and the second slope gradient, in particular the product (i.e. multiplication) of the first slope gradient and the second slope gradient. It is particularly preferred that the following formula is used:

$$h = \pm \sqrt{\frac{1}{|g1 \times g2|}}$$

wherein h is the yaw rate and g1 and g2 are the first slope gradient and the second slope gradient.

As will be explained further below, the slope gradients may be calculated directly based on range and range-rate values of the spectrum cells or recognition points.

An ECU (also referred to as a control device) and the method according to the present disclosure may be implemented by a dedicated computer constituting a processor programmed to execute one or plural functions embodied by a computer program. Alternatively, the control device and the method according to the present disclosure may be implemented by a dedicated computer constituting a processor by dedicated hardware logic circuit. Alternatively, the controller and the method according to the present disclosure may be implemented by one or more dedicated computers configured by a combination of a processor executing a computer program and one or more hardware logic circuits. Further, the computer program may be stored in a computer readable non-transitory tangible recording medium as an instruction to be executed by the computer.

While the embodiments, the configurations, the aspects of a detection method for detecting a yaw rate and/or the heading of an object vehicle have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A radar detection device for a vehicle, comprising:
   a radar sensor; and
   a data processing device,
   wherein:
   the data processing device is designed to perform a detection method for detecting a yaw rate h and/or a heading H of an object vehicle based on sensor data of the radar sensor mountable on an ego-vehicle, wherein the sensor data are retrieved in a form of a range rate spectrum from the radar sensor, the detection method comprising:
   determining two clusters of spectrum cells or recognition points within the range rate spectrum, wherein two clusters includes a first cluster and a second cluster, the spectrum cells or the recognition points of the first cluster have an intensity value above an intensity-threshold and are arranged on a first linear stretch, and the spectrum cells or recognition points of the second cluster have an intensity value above the intensity-threshold and are arranged on a second linear stretch,
   determining a first lope gradient g1 for the spectrum cells or recognition points in the first cluster and a second slope gradient g2 for the spectrum cells or recognition points in the second cluster, wherein the first slope gradient and the second slope gradient are defined as a ratio of a range rate difference among the spectrum cells or recognition points in a respective cluster of the first cluster and the second cluster,
   wherein at least one of the following steps is performed:
   calculating the yaw rate h of the object vehicle based on a function of the first slope gradient g1 and the second slope gradient g2, according to a following formula:

$$h = \pm \sqrt{\frac{1}{|g1 \times g2|}} \; ;$$

and/or
   Calculating the heading H of the object vehicle based on a function of the first slope gradient g1 and the second slope gradient g2, according to a following formula:

$$H = \pm \arctan\left(\sqrt{\left|\frac{g1}{g2}\right|}\right).$$

2. The radar detection device according to claim 1, wherein:
the first linear stretch and the second linear stretch form a V-shape.

3. The radar detection device according to claim 1, wherein:
the range to range rate spectrum is analyzed in a preprocessing to identify any relevant spectrum cells with an intensity value above the intensity-threshold; and
the relevant spectrum cells are admitted to a clustering algorithm.

4. The radar detection device according to claim 1, wherein:
only such spectrum cells or recognition points are identified for clustering, which are arranged exactly on one of two stretches, or additionally such spectrum cells or recognition points are identified for clustering, which have a lateral distance to one of the two stretches, which is below a distance threshold, the two stretches including the first linear stretch and the second linear stretch.

5. The radar detection device according to claim 1, wherein:
a slope gradient is an averaged value of the ratios of range difference to range rate difference for pairs of spectrum cells or recognition points within a cluster.

6. The radar detection device according to claim 2, wherein:
the range to range rate spectrum is searched for two linear stretches forming a V-shape with an image recognition method.

7. The radar detection device according to claim 1, wherein:
at least one of the linear stretches is determined by calculating a best fit line within a pre-selected set of spectrum cells or recognition points.

8. The radar detection device according to claim 1, wherein:
the detection method is performed among spectrum cells and/or recognition points from a single radar measurement.

9. The radar detection device to claim 1, wherein:
a subset of spectrum cells or recognition points within the range to range rate spectrum is pre-selected based on prior object recognition or tracking results; and
the detection method is performed on the pre-selected subset.

10. The radar detection device according to claim 1, wherein:
such spectrum cells or recognition points are pre-selected, which are attributed to a previously tracked or recognized object vehicle.

11. The radar detection device according to claim 1, wherein:
the yaw rate h of the object vehicle is determined based on one of the determined slope gradients including g1, g2 and the determined heading H according to one of the following formulae:

$$h = \pm \frac{1}{g1\tan(H)}; \text{ and}$$

$$h = \mp \frac{1}{g2\cot(H)}.$$

12. The radar detection device according to claim 1, wherein:
a length LF of a visible front/back of the object vehicle and/or a length LS of a visible long side of the object vehicle is detected based on a difference among a maximum range value including Rmax1 and Rmax2 and a minimum range value including Rmin1 and Rmin2 among the spectrum cells or recognition points within one of the clusters and the determined heading H of the object vehicle, according to one of the following formulae:

$$LF = \frac{R\max1 - R\min1}{\cos(H)}; \text{ and}$$

$$LS = \frac{R\max2 - R\min2}{\sin(H)}.$$

13. The radar detection device according to claim 1, wherein:
a sign ambiguity in determination of the heading H or the yaw rate h is resolved based on azimuth measurements or previous target states from object tracking/object recognition.

* * * * *